United States Patent
Goldberg et al.

(10) Patent No.: US 8,390,720 B2
(45) Date of Patent: Mar. 5, 2013

(54) ADVANCED MAGNIFICATION DEVICE AND METHOD FOR LOW-POWER SENSOR SYSTEMS

(75) Inventors: Bar-Giora Goldberg, San Diego, CA (US); Gioia Messinger, Encinitas, CA (US); Christopher McGill, San Diego, CA (US)

(73) Assignee: AVAAK, Inc., San Diego, CA (US)

( * ) Notice: Subject to any disclaimer, the term of this patent is extended or adjusted under 35 U.S.C. 154(b) by 62 days.

(21) Appl. No.: 12/780,068

(22) Filed: May 14, 2010

(65) Prior Publication Data

US 2012/0019671 A1 Jan. 26, 2012

(51) Int. Cl.
*H04N 5/222* (2006.01)
*H04N 5/262* (2006.01)
*H04N 7/14* (2006.01)

(52) U.S. Cl. ............... 348/333.11; 348/240.3; 348/14.08

(58) Field of Classification Search ............... 348/207.1, 348/240.3, 211.2, 333.05, 333.11, 333.13
See application file for complete search history.

(56) References Cited

U.S. PATENT DOCUMENTS

| | | | |
|---|---|---|---|
| 2003/0090505 A1* | 5/2003 | McGee et al. | 345/721 |
| 2007/0035623 A1* | 2/2007 | Garoutte et al. | 348/143 |
| 2007/0297509 A1* | 12/2007 | Mizobuchi et al. | 375/240.12 |
| 2008/0246852 A1* | 10/2008 | Mori | 348/222.1 |
| 2009/0295976 A1* | 12/2009 | Choi | 348/333.11 |
| 2010/0220215 A1* | 9/2010 | Rubinstein et al. | 348/231.99 |

* cited by examiner

*Primary Examiner* — Trung Diep
(74) *Attorney, Agent, or Firm* — Manuel F. de la Cerra

(57) ABSTRACT

A system and method is provided for enabling an advanced optical magnification (zooming) function for low-power sensors, such as a remote wireless camera, using electronic methods and enabling that magnification be performed in any part of the imager. An image sensor has a set of imager pixels that have a defined field of view. A display device is also provided, which has a far lower resolution than the imager. A magnification level is selected, which results in macroblocks being defined for the sensor. A display data value is generated for each macroblock, and the set of display data values is used to drive a data display. The area of magnification is flexibly selected on the imager. As the magnification level is increased, the number of imager pixels in each macroblock decrease, enabling the display to present increasingly higher resolution images. Accordingly, an aesthetically pleasing magnification function is provided for a low-power, battery operated mobile environment.

20 Claims, 13 Drawing Sheets

ADVANCED MAGNIFICATION DEVICE AND METHOD FOR LOW-POWER SENSOR SYSTEMS

This application is related to U.S. patent application Ser. No. 11/210,411, filed Aug. 24, 2005, and entitled "Network Sensor System and Protocol"; and to U.S. patent application Ser. No. 11/210,411, filed Aug. 30, 2007, and entitled "Network Sensor System and Protocol", both of which are incorporated herein in its entirety.

FIELD OF THE INVENTION

The present invention relates to remote imagers and their associated presentation for displaying images with a novel way for zooming at various levels of magnification in arbitrary areas of the image. More particularly, the present invention relates to a set of cameras or network cameras operating their associated image sensors and image processes in a way that conserves resources and power.

BACKGROUND

The field of remote sensing is growing rapidly. Remote sensing has been found to be useful in security applications, as well as for monitoring environmental, commercial and industrial processes. It has also proved useful in modern social networks, allowing users to conveniently see each other during chat sessions, and allow family members to share a more intimate online experience. Remote sensing may include capturing visible light images, temperature, vibrations, seismic, infrared images, chemical or acoustic data. The remote data is either stored locally for later collection, or more typically is transmitted via a wired or wireless connection to a data collection point. One popular remote sensor is the Internet camera. It will be understood that many other different types of sensors and sensor devices are available.

An Internet camera typically has a visible light sensor (such as a CMOS or CCD imager), and a connection to a local server or other host. The data connection may be wired or wireless. The Internet camera, similar to many types of sensor systems, uses a substantial amount of power. For example, the sensor itself may be a drain, as well as a local processor and memory system. Also, if the Internet camera uses a wireless communication connection, then radio transmitter and receiver each are significant power users. Because an Internet camera uses a substantial amount of power, the Internet camera needs an enduring power source. For example, the Internet camera may use a power adapter connected to grid power, or, if it uses a wired data link, may extract power from the data connection. In another example, the Internet camera may be constructed to allow for recharging of batteries, or for regular battery replacement. In a specific example, some digital cameras are known to have a Bluetooth compatible local connection. These digital cameras may be used to take an image, and then, the user is allowed to establish a wireless communication for moving the pictures to the computer. However, the digital camera has batteries that must be regularly replaced, or recharged. In this way, the digital camera is not practical for any meaningful long-term monitoring or security applications.

Because the Internet camera needs enduring power, its placement options are limited. Take for example a security installation. It would be desirable to place Internet cameras in discreet, out-of-the-way locations, and to have multiple cameras imaging a target area. However, these discreet locations are often difficult to physically get to, and do not have ready power sources. Accordingly, either 1) the discreet locations must be wired for power, or 2) the cameras must regularly be accessed for battery replacement. Either option is costly, and disruptive of the target area.

It is also desirable that sensors be able to take detailed and high resolution data, and communicate that data to a central location. In this regard, some sensors, such as the Internet camera, generate very large data or image files. Transmitting these large files may take substantial power, particularly in a wireless installation. It may be possible to save power by reducing the size of the image file, but important resolution and in detail may also be lost.

To further enhance usability and resolution, some cameras are equipped with an optical zoom system. The optical zoom comprises a moveable lens system that allows a user to focus on a smaller section of the field of view, and to increase visible detail and resolution in that selected area. Because of the way it operates, the selected area is always centered at a fixed center area of the camera axis line, limiting the utility of the device. In order to focus on others areas, the camera must be moved, either by hand or by sophisticated motor control. If the camera is intended to be remote from the user, then any zooming must be done using electric motors couple to the lens systems. Such systems use considerable power, are expensive to implement, and subject to frequent and inconvenient repair. Accordingly, the use of a true optical zoom has been limited to higher end cameras and sensing devices, and not to webcams or other lower-end imaging devices.

Due to the complexities and expense of the true optical zoom, many commercial imaging devices rely upon the less desirable digital zoom process. In a digital zoom, the camera device captures and stores an entire image captured from an imager, and will typically display the image onto a display device. As the user selects higher levels of digital zoom, the imager still captures the entire image file, but the file is post-processed to extract a decreasingly small area in the center of the image, and that limited data is diluted to occupy the whole display screen. In this way, each level of increased digital zoom acts to dilute the image more as it appears in the display. In use, this appears to the user as the undesirable effect of having the image lose resolution as the digital zoom is advanced. Not only does the digital zoom device necessarily operate on large image files, which need larger processors, memories, and consume considerable power, but in practice the digital zoom is seldom used due its lack of aesthetic appeal.

According, there is a need for an imager system that can be installed without the need to run power or data cables, and that is able to accommodate an aesthetically pleasing low-power magnification process.

SUMMARY OF THE INVENTION

Briefly, the present invention provides a system and method enabling an advanced optical magnification function for low-power sensors. An image sensor has a set of imager pixels that have a defined field of view. A display device is also provided, which may have, ore or less resolution than the imager. A magnification level is selected, which results in macroblocks (the macroblock is a term used herein to describe the fundamental output of the imager which is not necessarily a pixel, it can be an average of few pixels, or the output of binning and such) being defined for the sensor. A display data value is generated for each macroblock, and the set of display data values is used to drive a data display. As the magnification level is increased, the number of imager pixels in each macroblock decrease, enabling the display to present increasingly higher resolution images.

In a more specific example, the advanced magnification function is implemented in a low-power wireless camera, which is substantially powered by battery. Such a device is highly sensitive to resource and power constraints. The low-power wireless camera has an image sensor with a set of imager pixels that have a defined field of view. A display device is also provided, which may have a resolution similar to that of the image. A magnification level is selected, which results in macroblocks being defined for the sensor. A display data value is generated for each macroblock, and the set of display data values are used to drive a data display. As the magnification level is increased, the number of imager pixels in each macroblock decrease, enabling the display to present increasingly higher resolution images.

Advantageously, the advanced magnification system enables true optical zoom (magnification) relative to the original image yielding an aesthetically pleasing magnification process for a display; also, it can be applied in any section of the image, not only in its center, as is the case for optical lens usage. As the magnification level is increased, the display presents images having more resolution and detail. Further, a magnification box may be flexibly moved throughout the field of view, and highly granular levels of magnification are enabled. Since the original imager data is decimated at the imager source, the resulting display data file is relatively small as compared to known imager devices, allowing for smaller memories, less powerful processors, shorter transmission times, and lower bandwidth requirements. In this way, the camera is able to implement the advanced magnification system using minimal power and system resources.

For example, take an imager that has 1600×1200 pixels, but the transmitted display image is only QVGA (320×240), an image size quite standard in the security industry. The imager has approximately 1600×1200~2M pixels but the image being transmitted and displayed has only 320×240~77K macroblocks (the ratio is approximately 25:1). The imager allows either binning, or averaging of up to 25 pixels into a single macroblock. The magnification (zooming) process mentioned above allows improving the resolution of the originality generated image by choosing smaller and smaller areas of the imager, but keeping the number of macroblocks fixed, hence improving resolution and providing true "optical zooming" in the area chosen on the imager.

DETAILED DESCRIPTION OF THE PREFERRED EMBODIMENT

Figure 1:
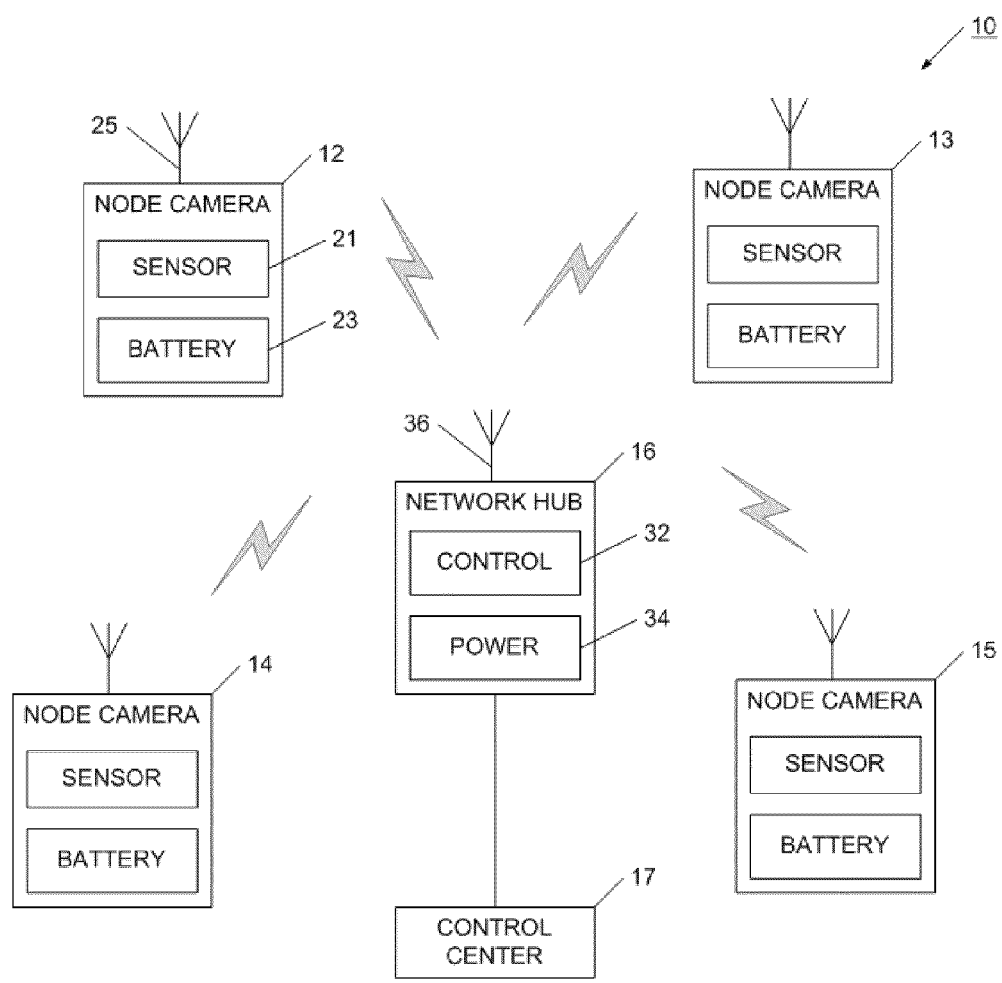
FIG. 1 is a block diagram of an advanced magnification system in accordance with the present invention.

Referring now to FIG. 1, an advanced magnification system is illustrated in operation on a set of low-power camera sensors. Low-power camera system 10 has a set of node cameras constructed to communicate with network hub 16. More specifically, FIG. 1 shows camera 12, camera 13, camera 14, and camera 15 wirelessly communicating with network hub 16. It will be appreciated that more or fewer cameras may be used, and that node cameras may be provided with different functionality. For example, some node cameras may be constructed to image invisible light, while others may be configured to monitor other wavelengths or to have sensors for detecting other activities. Although low-power camera sensor system 10 is described using visible light and image sensors, it will be appreciated that other types of sensors may be used.

For example, the sensors may provide acoustic, seismic, spectral, vibration, or other types of information. Each of the node cameras in low-power sensor system 10 is constructed to be a self-contained, self configuring, remote imaging device. In particular, each node camera, such as node camera 12, operates in a way that conserves battery 23 power while enabling high-quality sensor 21 images to be transmitted to network hub 16 from time to time. Advantageously, the low-power sensor system 10 also enables selectable magnification of the viewing area, and does so in a power-sensitive and aesthetically pleasing way. The structure and protocols used by node camera 12 enable the node camera to operate on the same battery 23 for one or more years. In this way, node cameras may be distributed in an area, provide image information over an extended period, and require no maintenance for extended periods. Further description of the power saving protocols and structures can be found in U.S. patent application Ser. No. 11/210,411, filed Aug. 24, 2005, and entitled "Network Sensor System and Protocol"; and in U.S. patent application Ser. No. 11/210,411, filed Aug. 30, 2007, and entitled "Network Sensor System and Protocol"; both of which are incorporated herein in their entirety.

Generally, node camera 12 has sensor 21 and battery 23 contained in a small compact physical housing. The housing also has a radio and antenna 25 to facilitate wireless communication with network hub 16. Node camera 12 also has a processor for managing the sensor and compressing image data prior to transmission, as well as manage the magnification processes. It will be appreciated that other components may be used in node camera 12. Network hub 16 also has a radio and antenna 36 for communicating with the node cameras. Typically, network hub 16 will be located in a more convenient accessible location, so its power requirements are less constrained than the power requirements for the node cameras. In one example, power 34 may be provided by a rechargeable battery. In another example, power 34 may be provided as a power adapter connected to an enduring power source. Since network hub 16 has increased power availability, it is provided with more advanced, control 32 capability and processing power. It will be appreciated that network sensor system 10 may include more then one hub, with each hub communicating to its own set of node cameras.

Network hub 16 may itself be a node on a larger network system. For example, network hub 16 may communicate with control center 17. Control center 17 may communicate with other network hubs, or may provide an interface for controlling network sensor system 10, as well as viewing or analyzing images taken from individual node cameras. It will be appreciated that control center 17 may comprise displays, storage equipment, and computer processing equipment. In this regard, controls to control center 17 may incorporate automatic processes for evaluating and assessing images received from node cameras. For example, the control center 17 may have processes for analyzing node camera images for risk assessment, as well as automated communication equipment for initiating and sending communications. In some cases, the control center 17 may use portable wireless devices for controlling the cameras and for displaying image information. Due to the limited size of the displays on such devices, the ability to magnify images to increase resolution is particularly attractive.

Figure 2:
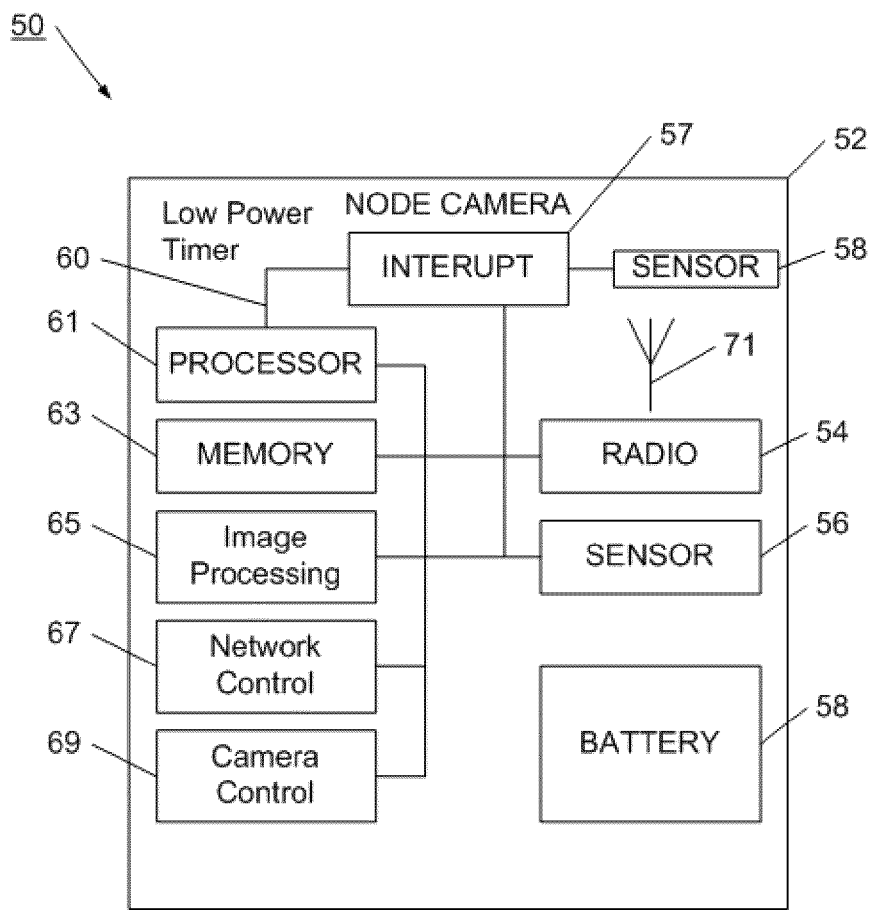
FIG. 2 is a block diagram of a node imager for use in an advanced magnification system in accordance with the present invention.

Referring now to FIG. 2, node camera 50 is described. Node camera 50 may be used, for example, in a network sensor system similar to network sensor system 10 described with reference to FIG. 1. Node camera 50 has a small and compact housing 52 for enclosing and protecting camera components. Node camera 50 includes a sensor 56 for capturing images in an area near node camera 50. The sensor may be, for example, a CMOS sensor for reduced power consumption, or may employ CCD imaging technology. The sensor may also be constructed to capture visible wavelength information, or may be set to detect other wavelengths, such as infrared. In another example, sensor 56 may be a seismic, vibration, audio, spectrometer, or other type of sensor. Node camera 50 also has processor 61 for providing control and processing capability to the node radio. For example, processor 61 may be constructed to configure and control sensor 56. In another example, processor 61 may apply image processing 65 to captured images, for example, to compress or encrypt image data. In one specific example, processor 61 applies a selected magnification level to sensor 26.

Processor 61 may also implement network control 67 settings and processes. For example, network control settings may define how often the node camera attempts to communicate with a huh, or settings regarding encryption or compression. Further, network control 67 settings may include a unique ID for node camera 50. The unique ID enables a control hub to be associated with a particular node camera. Node camera 50 also has camera control 69 settings. Camera control 69 settings may set integration times for sensor 56, define capture windows, or define timing and sequential information regarding image capture.

In providing the various functions, processor 61 cooperates with local memory 63. Local memory 63 provides storage space for images captured by sensor 56, as well as memory space for application and algorithmic processes performed by processor 61. Node camera 50 is intended for discrete installation, as well as long-term operation without any required maintenance. This includes for example remote operation relying fully on battery 58 for power. Depending upon network and camera settings, node camera 50 may operate without battery replacement for up to three years or more. It will be appreciated that as battery technology advances, additional gains in battery life may be expected. Even in a typical installation, node camera 50 has an expected battery life of over one year.

Figure 3:
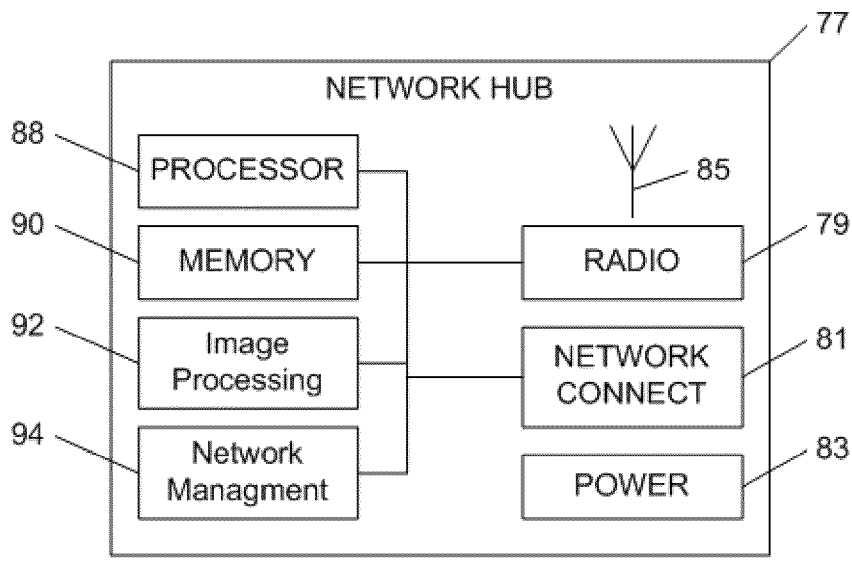
FIG. 3 is a block diagram of a network hub for use in an advanced magnification system in accordance with the present invention.

Referring now to FIG. 3, network hub 75 is illustrated. Network hub 75 is intended to facilitate communication and control of a set of node cameras, similar to node camera 50 described with reference to FIG. 2. Network hub 75 is intended to be installed in a reasonably accessible area so that power is less constrained then in the node camera. In this regard, housing 77 may be substantially larger than the housing used for the node camera. Also, power 83 may be provided by rechargeable batteries, or even through a direct connection to an enduring power source, such as a wall outlet. Network hub 75 may also include network connection 81, such as an Internet connection, for connection to a local or a proprietary wide area network. In this way, numerous network hubs may be connected together, as well as provide for convenient communication to a central control station. Network huh 75 also includes a radio 79 with antenna 85. The radio and antenna are constructed to facilitate two-way communication with a node camera. Network hub 75 also includes a processor 88 which cooperates with memory 90 for performing image processing functions 92 and network management functions 94. Since power is reasonably available on network hub 75, significant image processing, algorithmic processes, and network management functions may be performed.

Figure 4:
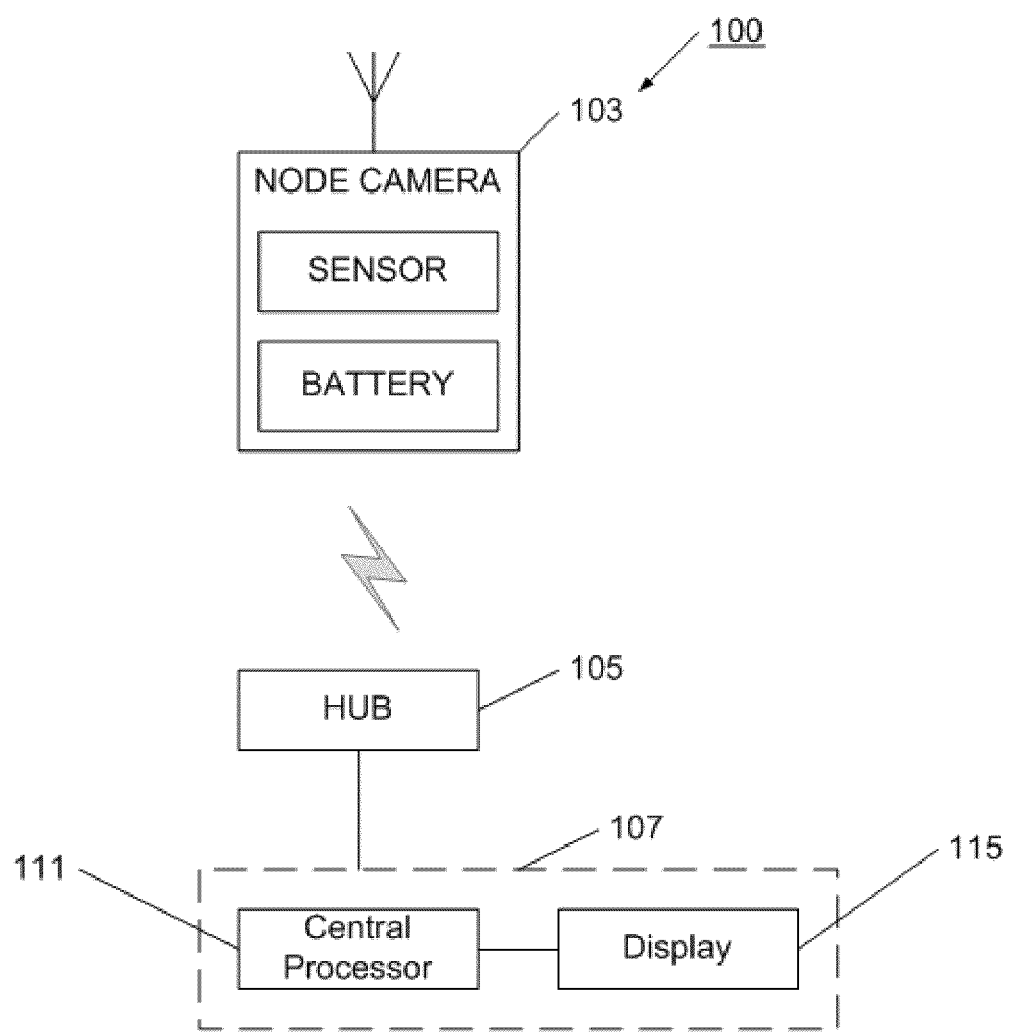
FIG. 4 is a block diagram of an advanced magnification system in accordance with the present invention.

Referring now to FIG. 4, an example embodiment of the advanced magnification device is illustrated operating with a low-power sensor camera system. The advanced magnification device 100 has a node camera 103 wirelessly communicating with a hub system 105 as previously described. Hub 105 communicates to a central system 107 using wired or wireless technologies. The central system 107 typically includes a central processor system 111 and a display 115. In some cases display 115 may be locally connected, and in other cases may be remote, for example, a wireless remote handset, cellphone or personal data assistant. Generally, node camera 103 and hub 105 will be remotely located, while the central processor 107 is at a more fixed and stable location. In operation, the node camera uses an image sensor to detect a particular viewing area, and many levels of aesthetically pleasing magnification are available using advanced magnification device 100.

It will be appreciated that a CMOS or CCD imager may have many times more pixel resolution than the presentation display, or vice versa. For example, it is common for an imager sensor to have many millions of pixels. In one example, a common imager has approximately 1600×1200 pixels. In contrast, a typical display for use on computer systems, remote handheld devices, and other personal consumer devices might have much lower number of pixels. For example, some portable remote display devices may have a display capable of only 320×240 pixels. Advantageously the advanced magnification device and method enables a digital zooming process that allows the presentation display to provide increased resolution and display quality as magnification levels are increased. In sharp contrast, known digital zoom processes decimate and reduce the quality of the image displayed to the user, thereby providing an undesirable aesthetic effect.

In operation, the node camera uses an image sensor to detect a particular image viewing area, and central processor 111, using either automated processes or operator input, selects a level of magnification for the sensor device. Node camera 103 adjusts its level of sensor decimation according to the selected level of magnification. For example, if the central processor instructs the camera to use its highest level of magnification, the node camera 103 will apply no decimation, and will provide pixel data to be directly presented on display 115. In another example, the central processor 111 may instruct node camera to use its lowest level of magnification. In this case, the node camera will divide the sensor into relatively large macroblocks, and decimate the image pixel information for each macroblock. In the process, the node camera generates a macroblock display data value for each macroblock. Then, the node camera transmits the macroblock data to the central system where it can be presented on display 115. In particular, each macroblock data point is displayed as a pixel on display 115. It will be appreciated that many imagers and processes are well known for decimating an image sensor, and that many levels of magnification are available using the advanced magnification device 100.

Advantageously, use of the advanced magnification system minimizes power requirements at the node camera 103, since image file size is reduced allowing for more efficient processing, encryption, and compression, as well as reduced transmission bandwidth and power. Further, node camera 103 may flexibly position its magnification box on the imager, and is able to provide for smooth panning across the imager field of view. In another advantage, any user or operator watching display 115 would experience a magnification process similar to an optical zoom. More particularly, a user, as magnification levels increase, would see and experience enhanced detail for the image. This is in contrast to the typical digital zoom, which provides an increasingly distorted and decimated presentation to the user. Thus, the method described allows improving resolution of the original image, by up to the ratio of the imager size to the display size, in the case of 2Mpixel imager and a QVGA image, ratio of 25:1.

Figure 5:
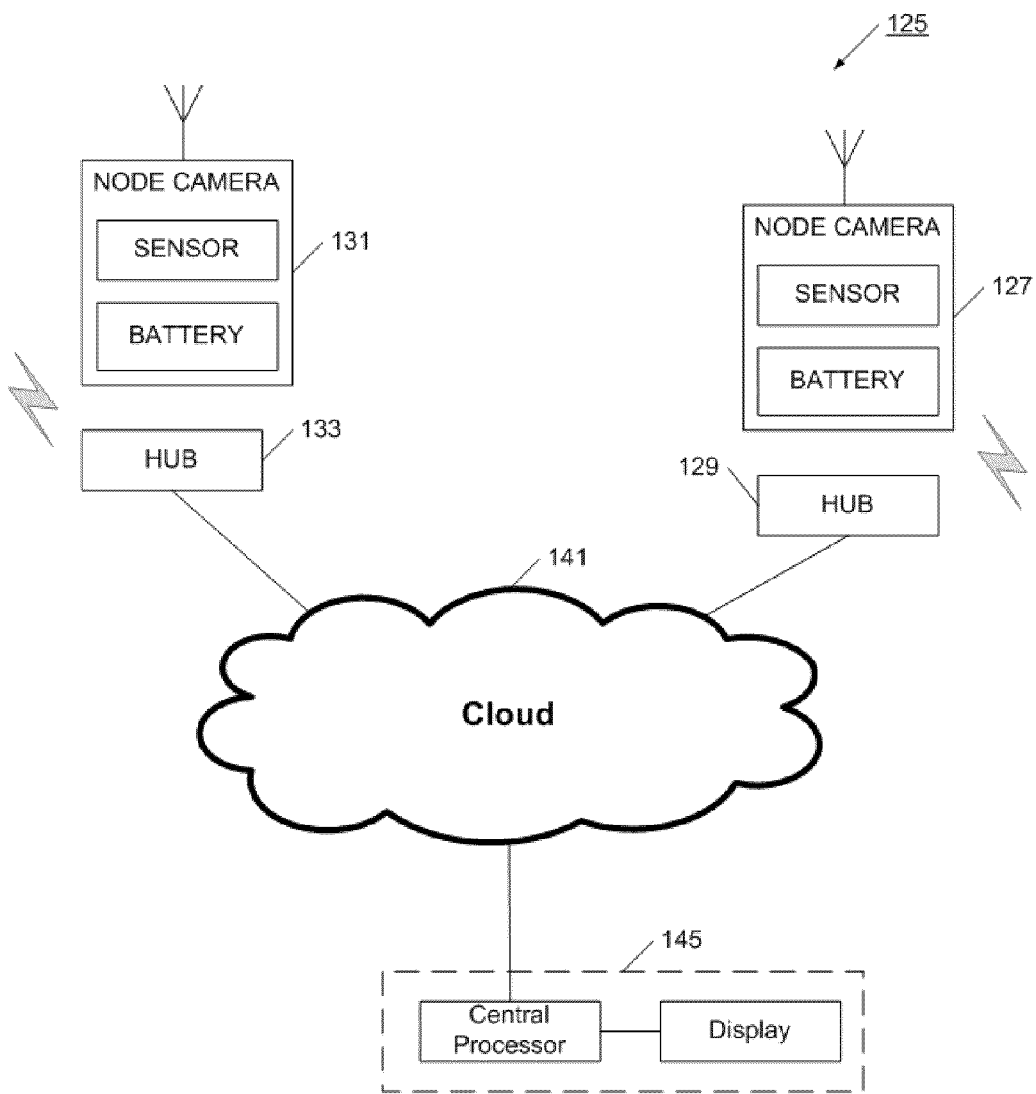
FIG. 5 is a block diagram of an advanced magnification system in accordance with the present invention.

Referring now to FIG. 5, an advanced magnification device and system is illustrated. Advanced magnification system 125 is similar to the magnification system 100 described with reference to FIG. 4, and so will not be described in detail. However, system 125 enables simplified wide area communications through the use of a network cloud 141. It will be understood that cloud 141 is preferably the Internet or some other public wide area network system. In system 125, remote sensor 131 communicates wirelessly to hub 133, which then communicates into the Internet cloud 141. In a similar manner, image sensor 127 communicates wirelessly to hub 129, which communicates to Internet cloud 141. One or more remote operation systems 145 are enabled to communicate with one or more of the sensor cameras. In this way, the central processor in the central station is able to configure the remote cameras for image operations, such as setting a magnification level. Image data received from the cameras may then be displayed on the central display system. It will be understood that operations center 145 may be a personal computer system or a cellphone, operated by an individual. In other instances the control system 145 may be a more formal security monitoring station. It will also be understood that the display may be a typical computer display device, or it may use a wireless remote device such as a portable handset, a portable computer, or a personal data assistant.

In use, an operator at the central processor is able to select one or more camera sensors to collect image data. Preferably, an operator or some automated process sets a desire magnification level, and in cases where additional detail is needed, selects and positions a magnification box for enhanced resolution display. Control, in some cases, may be from a remote wired or wireless devices, which may then also be used to display the image at its selected magnification level.

Figure 6:
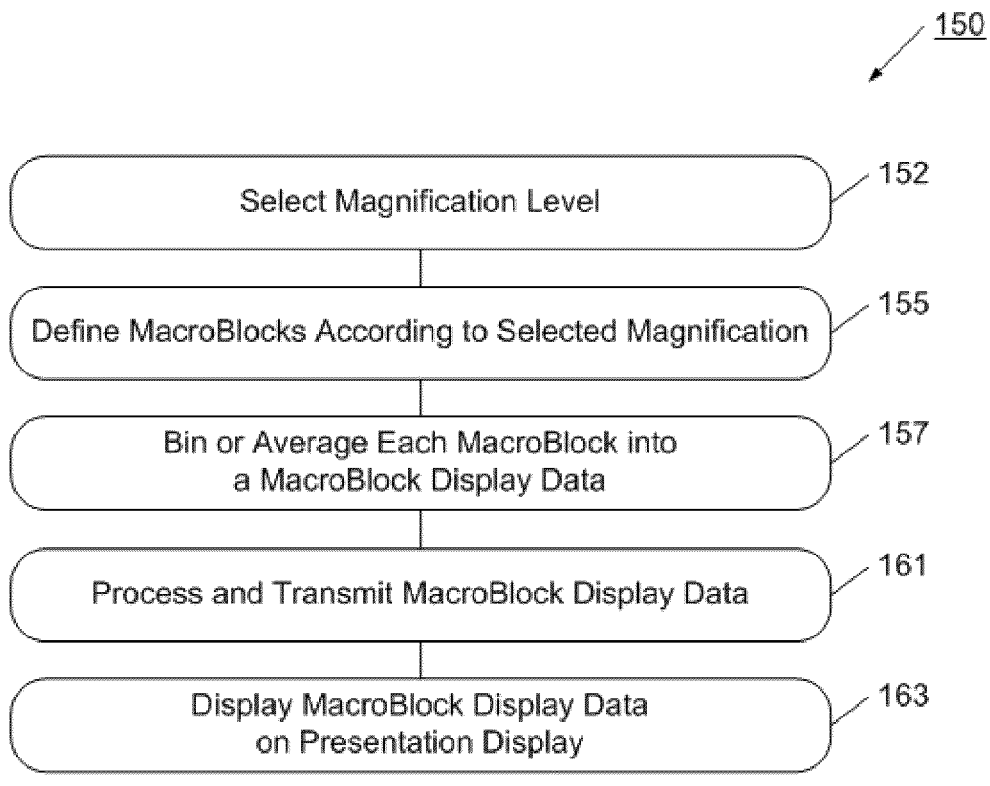
FIG. 6 is a flow chart of a method for use with an advanced magnification system in accordance with the present invention.

Referring now to FIG. 6, a method of selecting magnification level on a remote imaging device is illustrated. Method 150 allows an operator or an automated process to select a magnification level as illustrated in block 152. Depending upon the selected magnification level, the pixels in the imager device are arranged into macroblocks as shown in block 155. It will be appreciated that as the desired magnification level increases, the number of pixels in each macroblock will be reduced. For example, if maximum resolution and magnification is required, then a macroblock may have only one imager pixel, thereby having a one-to-one relationship between an imager pixel and a display pixel. In such case, a QVGA (320×240) section can be chosen anywhere in the imager and processed w/o any of the original dilution. However, in cases where lower magnification levels are needed, the quality of the imager data is decimated accordingly by assigning a single display data value to a macroblock that has a set of imager pixels.

As illustrated in block 157, the method 150 defines a display data value for each macroblock. It will be appreciated that there are several known processes, such as dilution, decimation, binning or averaging, for providing such a display data value. For example, the system may select a particular pixel, such as the center pixel, from each macroblock and ignore the other pixels. In another example, the system may average the value of all the pixels within an individual macroblock. It will also be appreciated that other more sophisticated processes may be used in defining the display data value. The display data values are then processed by the processor in the remote camera device. For example, the data display values may be compressed or otherwise prepared for transmission. After processing, the image data is then transmitted to the central station via a low-power wireless process as illustrated in block 161.

Advantageously, the decimated data file that is created is substantially smaller than the original image data files of known processes and therefore requires less power to process and transmit. For example, the data file generated for the advanced magnification device will have only sufficient data points for display on the relatively low resolution presentation display. In known imager devices, all pixel data is extracted from the sensor and the remote camera processes operate on the entire sensor image data. Since such a file may contain millions of pixel data points, such sensors require more memory, more sophisticated processors, more powerful processors, more current and other resource-consuming processes. Accordingly, by operating on a smaller set of decimated display data that correspond to macroblock geometries, power requirements are reduced for the remote camera device. Once the macroblock display data is processed, it is transmitted to a central station for display as shown in block 163.

Figure 7:
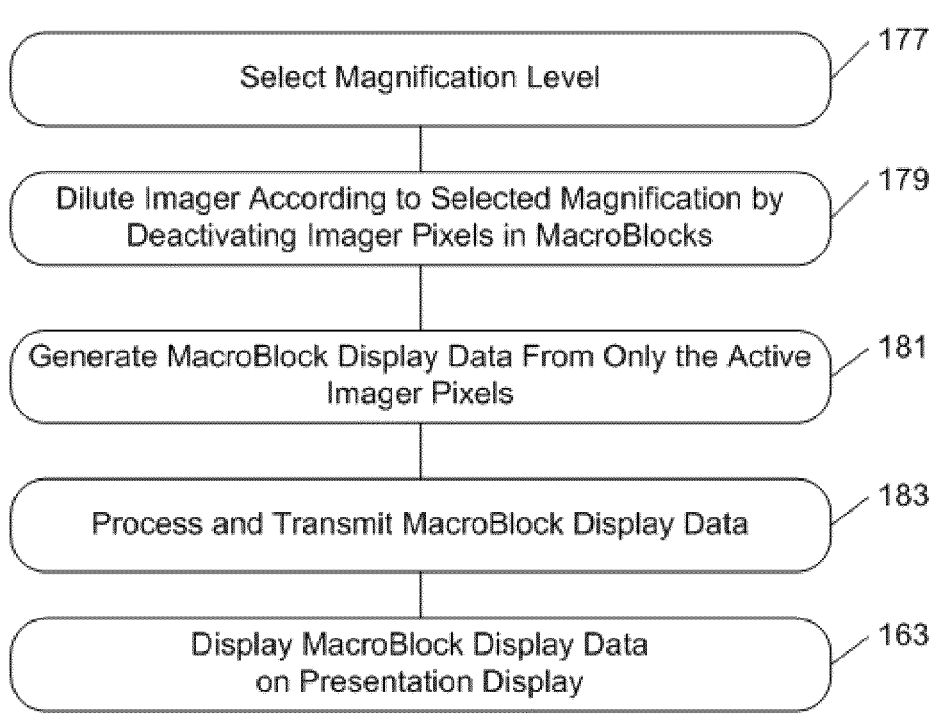
FIG. 7 is a flow chart of a method for use with an advanced magnification system in accordance with the present invention.

Referring now to FIG. 7, another process operating on an advanced magnification device is illustrated. Process 175 is similar to process 150 described with reference to FIG. 6, so it will not be described in detail. In block 177 an operator or automated processes selected magnification level. The sensor is diluted or decimated according to the selected magnification level in block 179. Block 181 shows that imager pixels that will not be used may be deactivated, thereby saving substantial sensor power. The data extracted from the active pixels is then processed as illustrated in block 183. In this way, the active pixel is considered the display data value for its associated macroblock. As with method 150, these processes operate on a substantially smaller decimated data file than in prior processes. Once the display data has been processed, it may be transmitted wirelessly from the sensor device to a central computer area where the display data may be displayed on a relatively low resolution display as illustrated in block 185.

Figure 8:
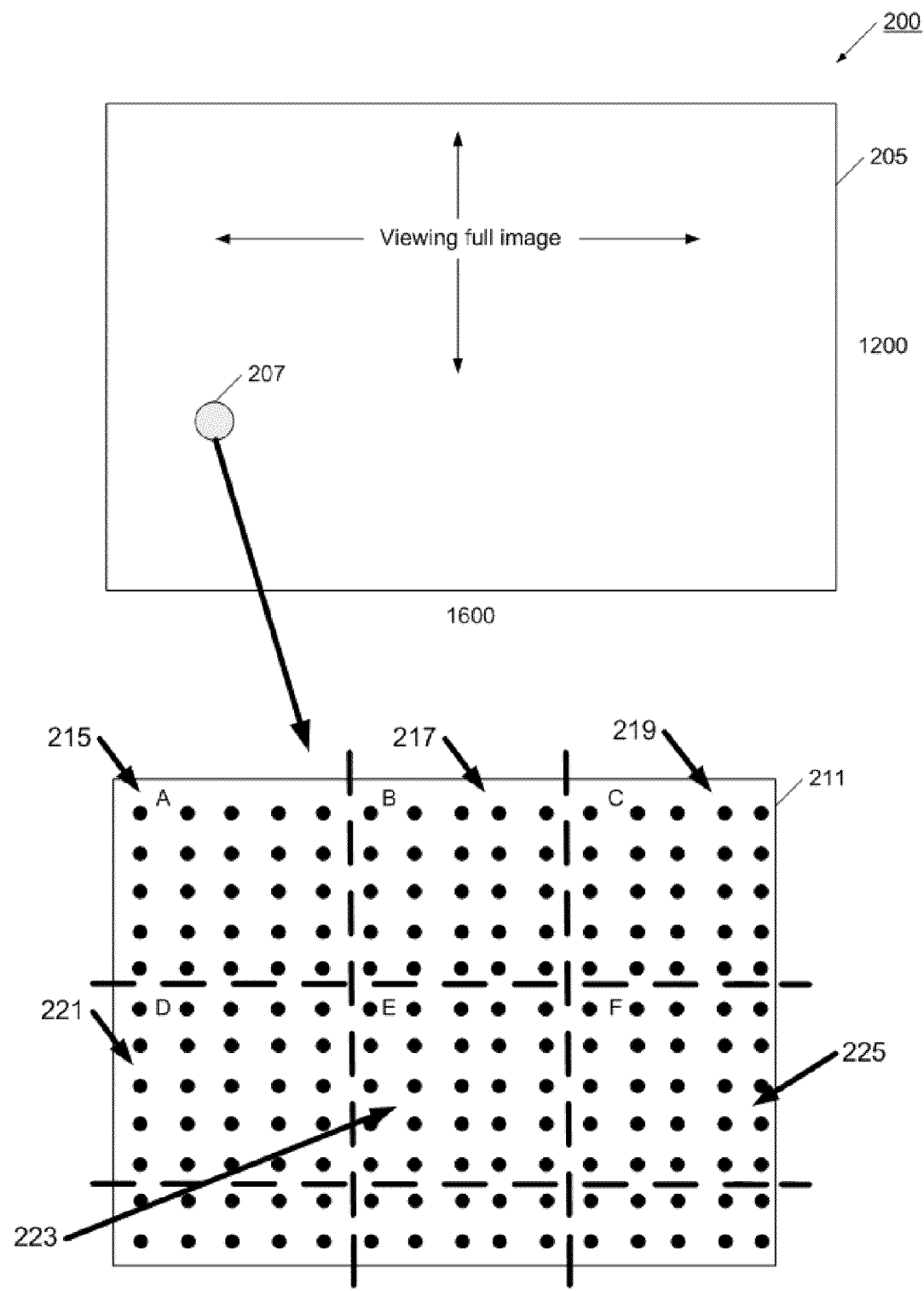
FIG. 8 illustrates operation of an imager in an advanced magnification system in accordance with the present invention.

Referring now to FIG. 8, a system and process providing for advanced magnification on a low-powered sensor device is described. System 200 has an imager device 205 positioned for collecting image information from a viewing area. It will be appreciated that image device 205 may be a CMOS or CCD device. It will also be appreciated that other imaging technologies may be substituted. In one example, the image device 205 has a resolution of 1600 pixels along the x-axis and 1200 pixels arranged on its y-axis. Accordingly, the image sensor 205 has approximately 2 million image pixels.

Figure 9:
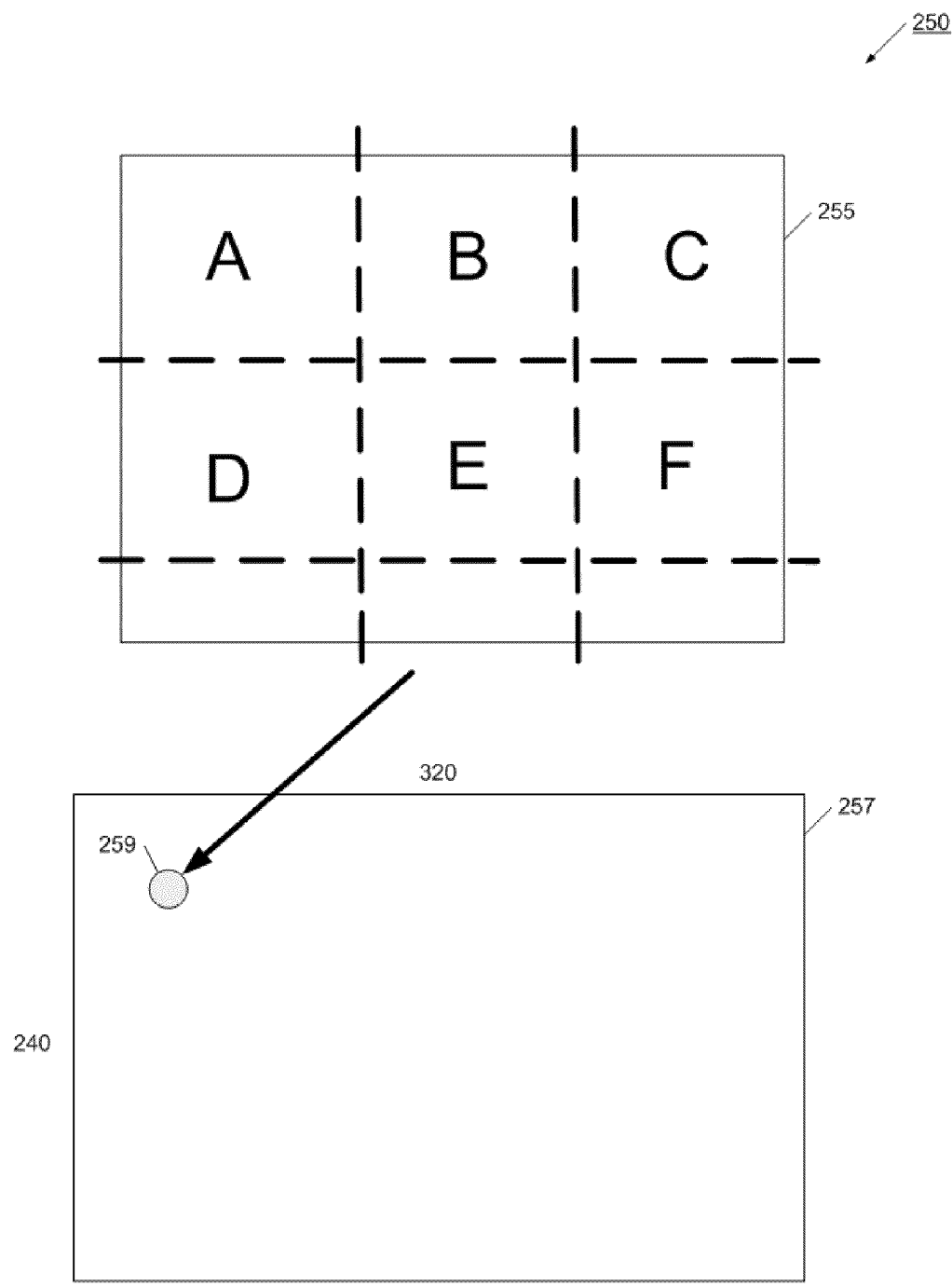
FIG. 9 illustrates operation of a display in an advanced magnification system in accordance with the present invention.

In one example, it is desired to display the entire viewing area of the imager 205 on a display (see display 257 of FIG. 9). For many technical reasons (power, bandwidth) the display might be chosen to have much lower resolution than an image sensor. For example, display 257 shown in FIG. 9 has a display with 320 display pixels along its x-axis and 240 pixels arranged on its y-axis. Accordingly, the display 257 has approximately 77,000 display pixels. With the sensor having about 2 million image pixels, and the display having about 77,000 display pixels, it can be seen that the image sensor 205 has about 25 times the resolution of the display 257. Accordingly, to view the full image on the display, the imager is divided into pixel macroblocks, with each macroblock representing approximately 25 pixels. As illustrated in Circle 207, a small portion of the imager is enlarged for review as shown at block 211. The imager is divided into pixel macroblocks identified as A 215, B 217, C 219, D 221, E 223, and F 225. Each of these macroblocks has a set of 25 image pixels.

It will be appreciated that the resolution of the imager and the resolution of the display will determine the size and shape of the macroblocks needed for a full image display. For example, an imager with higher resolution would require more pixels per macroblock, while having a display with higher resolution would act to reduce the number of pixels in each image macroblock. It will also be understood that some imagers have addressing or block limitations that would require minor modifications to the processes discussed herein.

The magnification process 250 at the camera then operates to determine a display data value for each of the defined macroblocks. As illustrated at 255 in FIG. 9, a single data value is assigned to each macroblock. In one example, the camera may select just one particular pixel out of each macroblock, for example the center pixel, and use that as the data display value. In another example, the display data value may be an average or some or all of the pixels in the macroblock, and the average value used as the display data value. In yet another example, unused pixels may be turned off, and a single pixel remains active with its data value being used as the display data value. Importantly, the six display data values illustrated in block 255 replace the 150 pixel data values from the raw imager as illustrated in 211. Accordingly, dramatically smaller decimated data files are generated using the advanced magnification device and process. These smaller data files make for simplified processing and reduced transmission bandwidth needs. Accordingly, the camera and the sensing device may operate using substantially less power, less memory, and less sophisticated processing devices. Once the display data value has been defined as shown in blocks 255, the law-power imaging device wirelessly transmits the small image file to the hub, which then acts to communicate the data file to the central computer and to the display. The display station then displays the pixel display values on the display 257 as shown at Circle 259.

Advantageously, the described process enables lower power consumption and lower processing requirements at the remote camera device, as well as providing an aesthetically pleasing display to users. In this way, a user is able to easily select areas of interest for further magnification, and as areas are selected, the display resolution increases.

Figure 10:
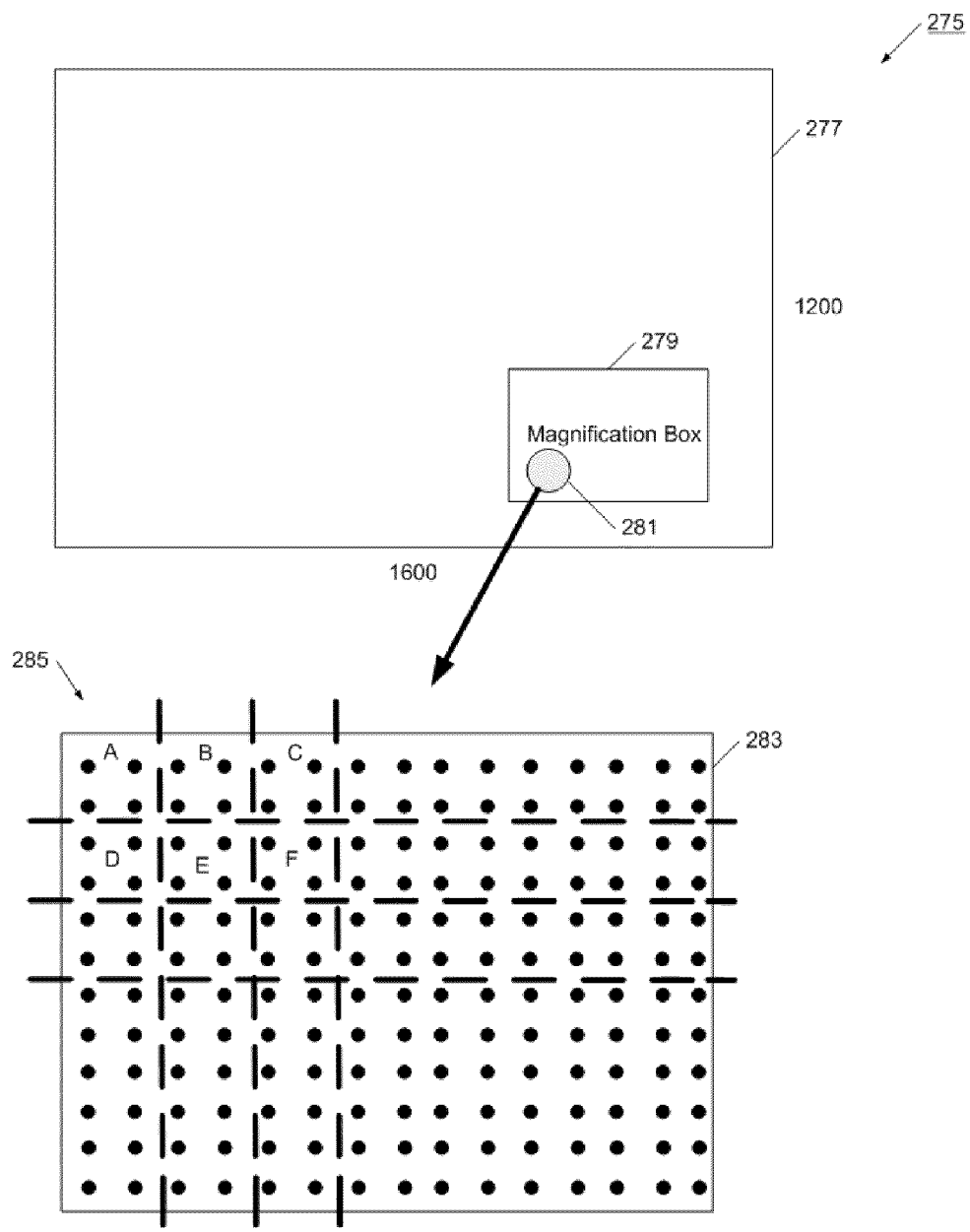
FIG. 10 illustrates operation of an imager in an advanced magnification system in accordance with the present invention.

Referring now to FIG. 10, and increased magnification process 275 is illustrated. In system 275, a user or an automated process selects an area of interest 279 from the overall viewing area. A small circle from the area is identified in block 281, and shown enlarged in block 283. The system defines a macroblock size according to the size of the area selected 279. As illustrated here, the system 275 provides a magnification of about six times over the full display illustrated with reference to FIGS. 8 and 9. Here, each macroblock contains 4 imager pixels. As before, a display data value is determined for each macroblock, and that macroblock value is transmitted and displayed on the display device. From a user's perspective, as an area of interest is selected, and the camera collects and processes data from that area, the user is presented with a higher resolution and more clear view of the area of interest. Advantageously, the user is also able to move the magnification box around the area of interest, panning and adjusting magnification levels with flexibility not available in known digital zoom processes. For example, the center of the magnification box may be placed in a wide number of positions on the imager, and the magnification levels may be very granular according to the density and architecture of the imager pixels.

Figure 11:
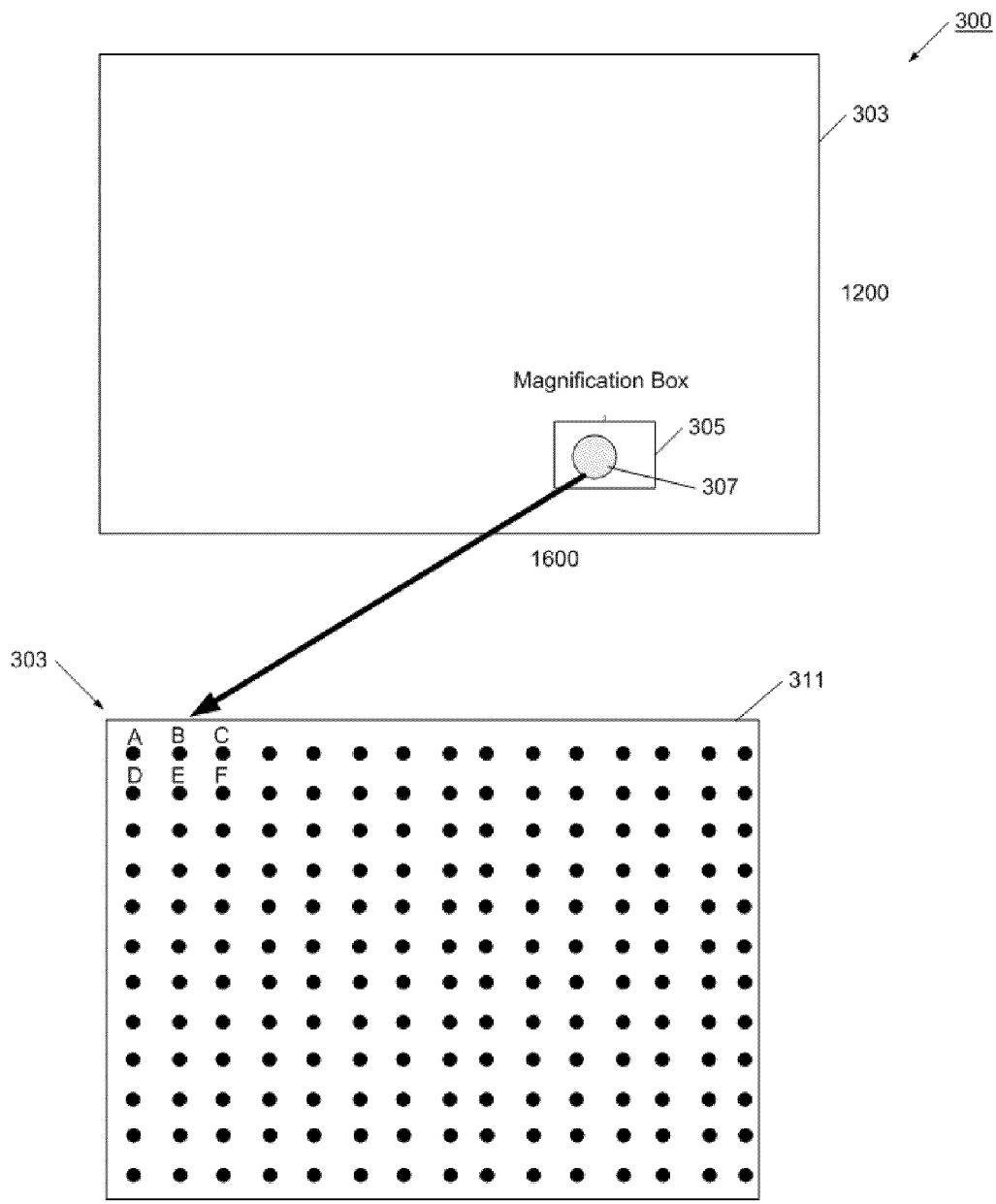
FIG. 11 illustrates operation of an imager in an advanced magnification system in accordance with the present invention.

FIG. 11 shows the advanced magnification device operating in its highest magnification level. In this example 300, the imager 303 has an area of interest 305 set to its smallest area. Circle 307 shows a magnified area from the area of interest 305 which is shown in block 303. At its highest level of magnification, the macroblocks are one pixel, thereby having a one-to-one relationship between an imager pixel and a display pixel. Accordingly, the values of the macroblocks are then transmitted wirelessly to the hub, and to the central computer where they are presented on the display.

Figure 12:
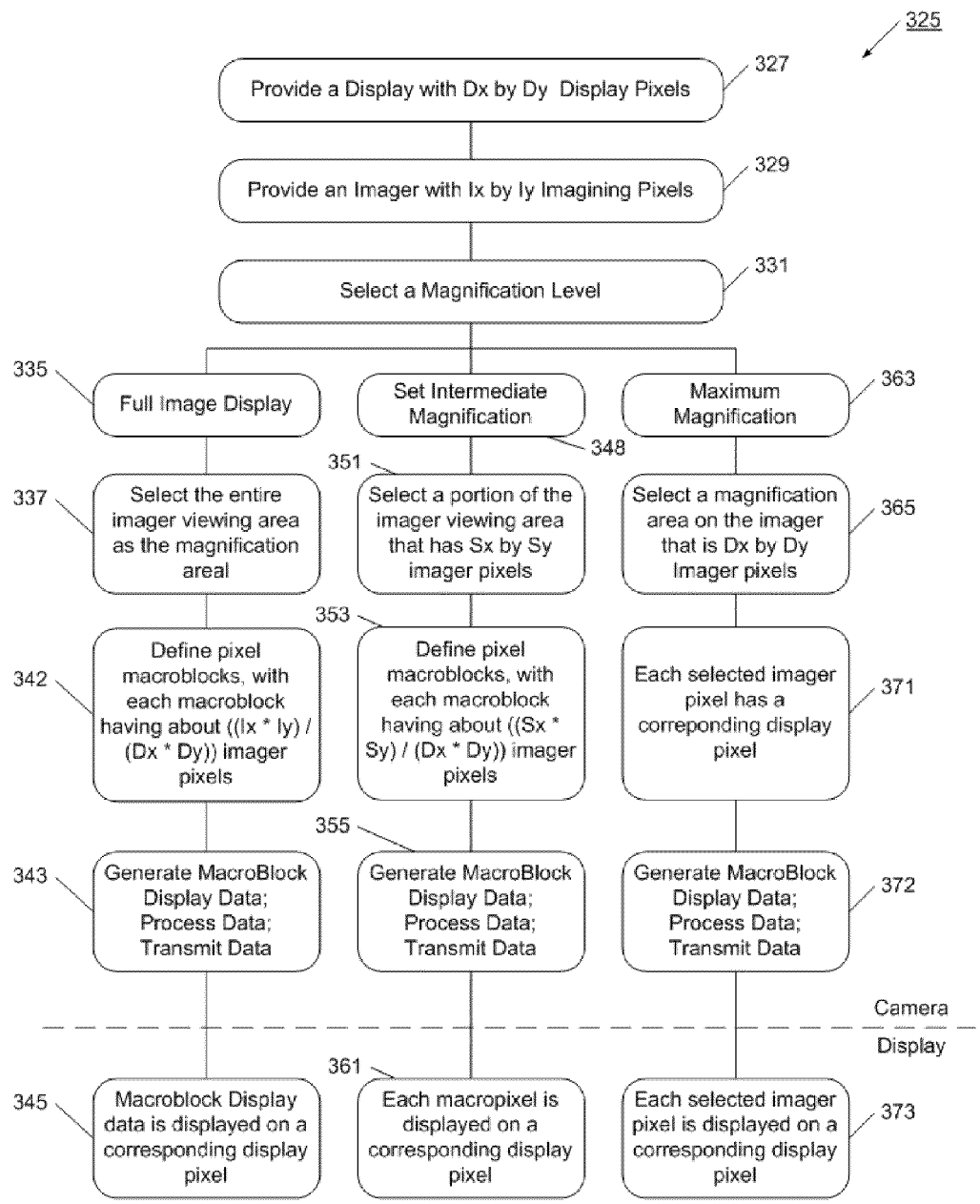
FIG. 12 is a flow chart of a method for use with an advanced magnification system in accordance with the present invention.

Referring now to FIG. 12, a method of operating an advanced magnification device is illustrated. The method provides a display having $D_x$ by $D_y$ display pixels as shown in block 327. The method also provides an imager with $I_x$ by $I_y$ imaging pixels as shown at block 329. The imager is incorporated into a remote sensor device that operates in an extreme low-power condition. Accordingly, it typically operates completely on a small battery, and preservation of power and processing resources is of utmost importance. An automated process or a user selects a magnification level as shown in block 331. In one example the user or algorithm selects to show a display of the full viewing area from the imager, as shown in block 335. This selects the entire imaging area as the magnification area as shown in block 337. The system then defines macroblocks for the imager, with each macroblock having a number of pixels approximately equal to the total number of imager pixels divided by the total number of display pixels. It will be appreciated that due to rounding effects, that some adjustment to these numbers will be needed. The remote camera then processes the macroblocks to determine a macroblock display data value as illustrated in block 343. These data values are then communicated to the central computer system where the macroblock display data values are presented on a display as shown in block 345.

In another example the user or algorithm may select a magnification less than the full image display as shown in block 348. In this case an area of interest is selected having a number of pixels $S_x$ by $S_y$ as shown in block 351. Preferably, the aspect ratio of the selected area of interest is approximately the aspect ratio of the display, although other ratios may be used. The system then defines macroblocks for the imager, with each macroblock having a number of pixels approximately defined by the total number of pixels in the area of interest divided by the number of pixels in the display. The system then acts to define a display data value for each macroblock and processes the decimated file as shown in block 355. The macroblock display data values are then transmitted to the central station for display as shown in block 361.

In a case where the user or the system selects maximum magnification as shown in block 363, the area of interest on the imager is defined as the same number of pixels as available on the display as shown in block 365. Accordingly, there is a one-to-one correspondence between an imager pixel and a display pixel as illustrated in block 371. This macroblock display data is then processed as illustrated in block 372, and then transmitted to the central system for display as shown in block 373.

Figure 13A:
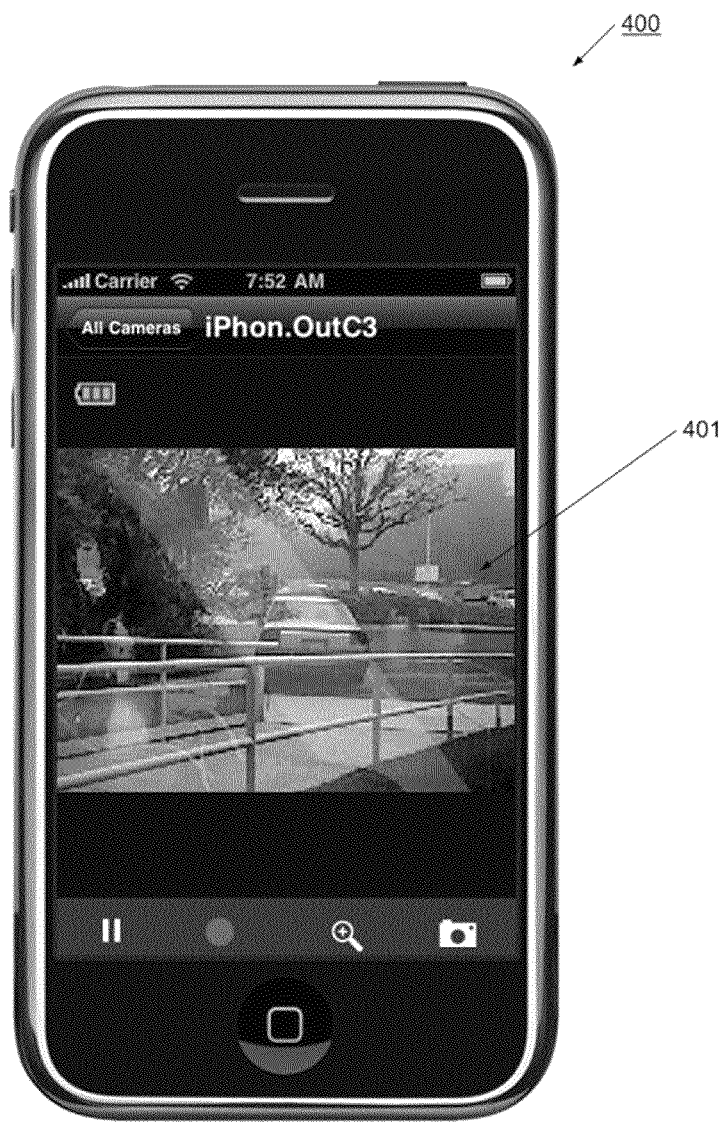
FIGS. 13A-C show an example of a display that was generated from an advanced magnification system in accordance with the present invention.
Figure 13B:
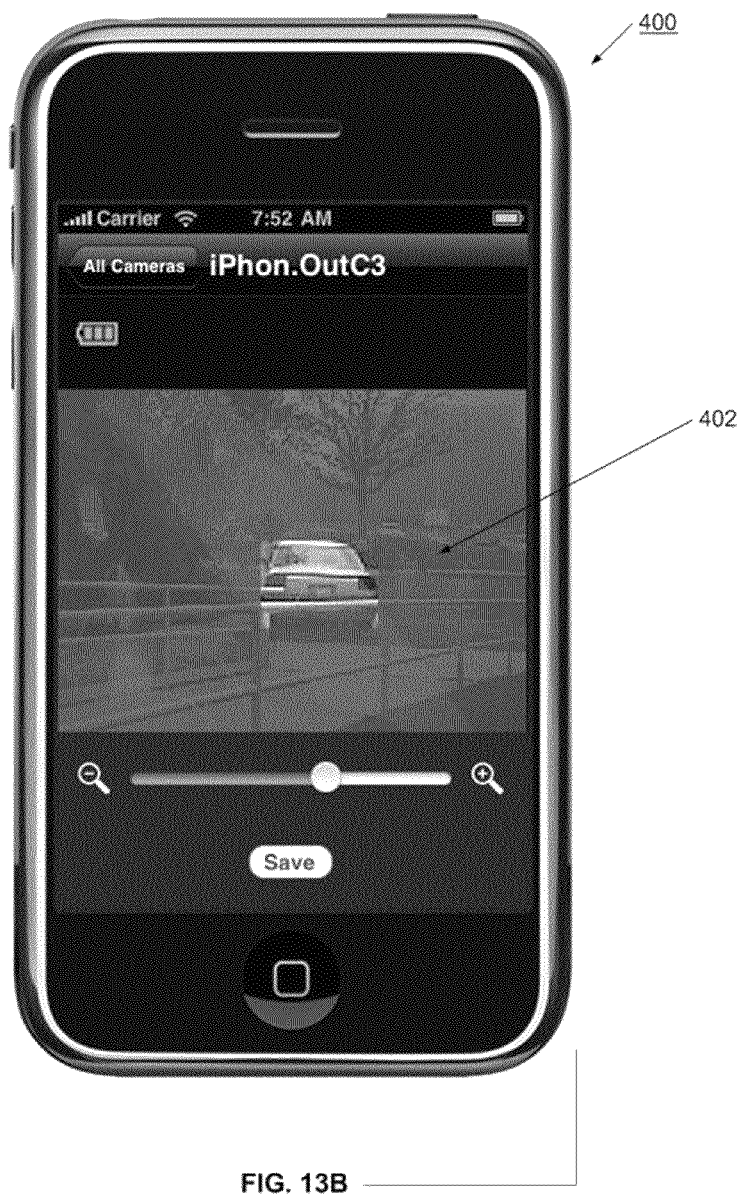
Figure 13C:

Referring now to FIG. 13, an example of the advanced magnification device and process is illustrated. FIG. 13 shows a remote wireless device 400 having a display area for displaying images from a remote sensing device. Display 401 shows an un-magnified view of a car sitting in a parking lot. This display image 401 represents the entire field of view from the remote sensor on the camera. As can be seen, the entire field of view is visible, but little resolution is available. Referring to FIG. 13B, a user has selected to focus the imager on the car as shown in display area 402 by position a magnification box around the car. As described earlier, the system now recalculates and lowers the number of pixels in each macroblock, thereby allowing for a higher resolution display. As illustrated in FIG. 13C, the area of interest has been magnified to the point where detail is now clearly visible. For example, the license plates numbers are now readable and further detail in the car is visible as illustrated in display area 403. Even further detail could be available if the imaging device is put into its highest level of magnification.

While particular preferred and alternative embodiments of the present intention have been disclosed, it will be appreciated that many various modifications and extensions of the above described technology may be implemented using the teaching of this invention. All such modifications and extensions are intended, to be included within the true spirit and scope of the appended claims.

What is claimed is:

1. An optical magnification process operating on a low-power camera device, comprising:
   providing an image sensor with a plurality of imager pixels;
   selecting one of a plurality of magnification levels;
   defining a magnification area within the imager's field of view;
   arranging the imager pixels into macroblocks;
   wherein the macroblock size is determined according to size of magnification area selected;
   determining a display data value for each macroblock based on the pixels contained in each macroblock;
   generating a data file comprising the display data values;
   transmitting the display data file;
   when the magnification level is changed, adjusting the arrangement of imager pixels in the macroblocks and display value for each macroblock.

2. The magnification process according to claim 1, further comprising the step of receiving an instruction to select the one of the plurality of magnification levels.

3. The magnification process according to claim 1, further comprising the step of setting the number of imager pixels in each of the macroblocks to 1.

4. The magnification process according to claim 1, further comprising the step of setting the number of imager pixels in each of the macroblocks to about the total number of imager pixels divided by the number of pixels to be presented for display.

5. The magnification process according to claim 1, further comprising the step of defining a magnification box within the imager's field of view, and setting the number of imager pixels in a macroblock to about the number of imager pixels within the magnification box divided by the number of pixels to be presented for display.

6. The magnification process according to claim 1, further comprising the step of providing a plurality of increasing levels of magnification, with each increased level of magnification providing a higher resolution image to a remote display.

7. The magnification process according to claim 6, wherein the generated data file is approximately the same size for different selected levels of magnification.

8. A process operating on a central server system for managing magnification and display processes comprising:
   communicating with a remote image sensor having a plurality of imager pixels;
   communicating with a display device having a plurality of display pixels;
   selecting one of a plurality of magnification levels available on the remote image sensor, the magnification levels determined by comparing the total number of imager pixels to the total number of display pixels;
   selecting an imager magnification area to be processed and displayed;
   transmitting an instruction to the remote image sensor to operate in the selected magnification level and area of the imager;
   arranging the pixels of an image into macroblocks;
   defining the macroblocks for the sensor and a data value for each macroblock;
   receiving an image file from the remote image sensor, the image file being about the same size irrespective of which magnification level was selected; and
   using the display data file to present the display image on the display.

9. The process according to claim 8, further comprising the step of transmitting to the remote image sensor the resolution of the display device.

10. The process according to claim 8, further comprising the step of providing the display device as a remote wireless handset.

11. The process according to claim 8, further comprising the step of communicating to the display device using the Internet.

12. The process according to claim 8, further comprising the step of communicating to the remote image sensor using the Internet.

13. A low-power camera device having flexible optical magnification comprising:
   an image sensor with a plurality of imager pixels;
   a low-power radio;

a processor operating the steps of:
- selecting one of a plurality of magnification levels;
- arranging the imager pixels into macroblocks;
- determining a display data value for each macroblock based on the pixels contained in each macroblock;
- selecting imager area to be magnified generating a data file comprising the display data values; and
- transmitting the display data file using the low-power radio;
- when the magnification level is changed, adjusting the arrangement of imager pixels in the macroblocks and display value for each macroblock.

14. The low-power camera according to claim 13, wherein the processor further operates the step of selecting the magnification level responsive to receiving an instruction from the low-power radio.

15. The low-power camera according to claim 13, further including a battery.

16. The low-power camera according to claim 15, wherein the battery supplies substantially all the power for the low-power camera.

17. The low-power camera according to claim 13, wherein the processor further operates the step of setting the number of imager pixels in each of the macroblocks to about the total number of imager pixels divided by the number of pixels to be presented for display.

18. The low-power camera according to claim 13, wherein the processor further operates the step of receiving information from the low-power radio to define a magnification box within the image sensor's field of view.

19. The low-power camera according to claim 18, wherein the processor further operates the step of setting the number of imager pixels in each of the macroblocks to about the number of imager pixels within the magnification box divided by the number of pixels to be presented for display and choose the area of the imager to be processed.

20. The low-power camera according to claim 13, wherein the processor further operates the step of providing a plurality of increasing levels of magnification, with each increased level of magnification providing a higher resolution image to a remote display.

* * * * *